US008045983B2

(12) United States Patent
Bantukul

(10) Patent No.: US 8,045,983 B2
(45) Date of Patent: Oct. 25, 2011

(54) METHODS SYSTEMS, AND COMPUTER PROGRAM PRODUCTS FOR PROVIDING INTERNET PROTOCOL MULTIMEDIA SUBSYSTEM (IMS) SERVICES IN RESPONSE TO ADVANCED INTELLIGENT NETWORK (AIN) TRIGGERS

(75) Inventor: Apirux Bantukul, Cary, NC (US)

(73) Assignee: Tekelec, Morrisville, NC (US)

( * ) Notice: Subject to any disclaimer, the term of this patent is extended or adjusted under 35 U.S.C. 154(b) by 181 days.

(21) Appl. No.: 11/787,199

(22) Filed: Apr. 13, 2007

(65) Prior Publication Data
US 2007/0243870 A1 Oct. 18, 2007

Related U.S. Application Data

(60) Provisional application No. 60/791,697, filed on Apr. 13, 2006.

(51) Int. Cl.
*H04W 4/00* (2009.01)
*H04M 1/725* (2006.01)
*H04L 12/66* (2006.01)

(52) U.S. Cl. ............ 455/435.1; 455/412.1; 370/352

(58) Field of Classification Search ............ 370/352, 370/201.1, 401; 455/435.1, 412.1, 466; 379/88.13, 379/221.08, 210.02; 709/227, 206; 707/100
See application file for complete search history.

(56) References Cited

U.S. PATENT DOCUMENTS

| | | | |
|---|---|---|---|
| 6,295,457 B1 | 9/2001 | Narayanaswamy | |
| 6,470,010 B1 | 10/2002 | Szviatovszki et al. | |
| 6,795,444 B1 | 9/2004 | Vo et al. | |
| 6,870,827 B1 * | 3/2005 | Voit et al. | 370/352 |
| 6,871,070 B2 | 3/2005 | Ejzak | |
| 7,085,260 B2 | 8/2006 | Karaul et al. | |
| 7,164,913 B1 | 1/2007 | Dantu et al. | |
| 7,173,925 B1 | 2/2007 | Dantu et al. | |
| 7,181,537 B2 | 2/2007 | Costa-Requena et al. | |
| 7,283,506 B2 | 10/2007 | Mayer et al. | |
| 7,480,915 B2 | 1/2009 | Costa Requena et al. | |
| 7,706,785 B2 | 4/2010 | Lei et al. | |
| 7,751,359 B1 | 7/2010 | Bienn et al. | |
| 2002/0012433 A1 | 1/2002 | Haverinen et al. | |

(Continued)

FOREIGN PATENT DOCUMENTS

| | | |
|---|---|---|
| GB | 2419774 A | 5/2006 |
| WO | WO 2005/027459 A1 * | 8/2004 |
| WO | WO 2005/027459 A1 | 3/2005 |
| WO | WO 2006/012381 A1 | 2/2006 |
| WO | WO 2007/120876 A2 | 10/2007 |
| WO | WO 2009/033179 A2 | 3/2009 |

OTHER PUBLICATIONS

Notice of Transmittal of the International Search Report and the Written Opinion of the International Searching Authority, or the Declaration for International Application No. PCT/US07/09252 (Sep. 22, 2008).

(Continued)

*Primary Examiner* — Kiet Doan
(74) *Attorney, Agent, or Firm* — Jenkins, Wilson, Taylor & Hunt, P.A.

(57) ABSTRACT

The subject matter described herein relates to methods, systems, and computer program products for providing Internet protocol multimedia subsystem (IMS) services in response to advanced intelligent network (AIN) triggers. According to one aspect, a method for providing an IMS service in response to an AIN trigger is provided. The method includes detecting the firing of an AIN trigger concerning an IMS registered non-IMS device. An IMS service to be provided in response to the AIN trigger is identified. The IMS service is provided.

15 Claims, 13 Drawing Sheets

U.S. PATENT DOCUMENTS

| | | | |
|---|---|---|---|
| 2002/0048359 A1* | 4/2002 | Tuunanen | 379/221.08 |
| 2002/0110104 A1 | 8/2002 | Surdila et al. | |
| 2002/0126656 A1 | 9/2002 | Park | |
| 2002/0176404 A1 | 11/2002 | Girard | |
| 2003/0026245 A1 | 2/2003 | Ejzak | |
| 2003/0026289 A1 | 2/2003 | Mukherjee et al. | |
| 2003/0027569 A1 | 2/2003 | Ejzak | |
| 2003/0069934 A1* | 4/2003 | Garcia-Martin et al. | 709/206 |
| 2003/0095569 A1 | 5/2003 | Wengrovitz et al. | |
| 2003/0130864 A1 | 7/2003 | Ho et al. | |
| 2003/0169768 A1 | 9/2003 | Bienn et al. | |
| 2004/0068574 A1 | 4/2004 | Costa Requena et al. | |
| 2004/0103157 A1 | 5/2004 | Requena et al. | |
| 2004/0153667 A1 | 8/2004 | Kastelewicz et al. | |
| 2004/0190498 A1 | 9/2004 | Kallio et al. | |
| 2004/0190689 A1 | 9/2004 | Pelaez et al. | |
| 2004/0198352 A1 | 10/2004 | Aitken et al. | |
| 2005/0002407 A1 | 1/2005 | Shaheen et al. | |
| 2005/0078642 A1 | 4/2005 | Mayer et al. | |
| 2005/0090259 A1 | 4/2005 | Jain et al. | |
| 2005/0152275 A1 | 7/2005 | Laurila et al. | |
| 2005/0202819 A1 | 9/2005 | Blicker | |
| 2006/0058028 A1* | 3/2006 | Allison et al. | 455/435.1 |
| 2006/0068762 A1 | 3/2006 | Baldwin et al. | |
| 2006/0114885 A1 | 6/2006 | Baek et al. | |
| 2006/0120355 A1 | 6/2006 | Zreiq et al. | |
| 2006/0174009 A1* | 8/2006 | Martiquet et al. | 709/227 |
| 2006/0206504 A1* | 9/2006 | Cai et al. | 707/100 |
| 2006/0211448 A1 | 9/2006 | Reiss et al. | |
| 2006/0256774 A1 | 11/2006 | Rigaldies et al. | |
| 2007/0097983 A1 | 5/2007 | Nylander et al. | |
| 2007/0100981 A1 | 5/2007 | Adamczyk et al. | |
| 2007/0156909 A1 | 7/2007 | Osborn et al. | |
| 2007/0206613 A1 | 9/2007 | Silver et al. | |
| 2007/0211695 A1 | 9/2007 | Shi et al. | |
| 2007/0217394 A1* | 9/2007 | Greene et al. | 370/352 |
| 2007/0254648 A1 | 11/2007 | Zhang et al. | |
| 2007/0263608 A1 | 11/2007 | Han et al. | |
| 2007/0280447 A1 | 12/2007 | Cai et al. | |
| 2007/0282911 A1 | 12/2007 | Bantukul et al. | |
| 2007/0297376 A1 | 12/2007 | Gass | |
| 2008/0090570 A1 | 4/2008 | Deshpande et al. | |
| 2008/0304462 A1 | 12/2008 | Burgess et al. | |
| 2008/0318551 A1 | 12/2008 | Palamara et al. | |
| 2009/0070469 A1 | 3/2009 | Roach et al. | |

OTHER PUBLICATIONS

Notification of Transmittal of the International Search Report and the Written Opinion of the International Searching Authority, or the Declaration for International Application No. PCT/US07/09254 (Sep. 15, 2008).

Digital Cellular Telecommunications System (Phase 2+); Universal Mobile Telecommunications System (UMTS); Signalling Flows for the IP Multimedia Call Control Based on SIP and SDP; Stage 3 (3GPP TS 24.228 Version 5.1.0 Release 5), pp. 1-346 (Jun. 2002).

"IP Multimedia Subsystem," http://en.wikipedia.org/wiki/IP_Multimedia_Subsystem, pp. 1-14 (Publication Date Unknown).

Official Action for U.S. Appl. No. 11/787,216 (Jul. 8, 2009).

Interview Summary for U.S. Appl. No. 11/787,216 (Jul. 12, 2010).

Final Office Action for U.S. Appl. No. 11/787,216 (Mar. 18, 2010).

Interview Summary for U.S. Appl. No. 11/787,216 (Nov. 30, 2009).

Notification of Transmittal of the International Search Report and the Written Opinion of the International Searching Authority, or the Declaration for International Application No. PCT/US2008/075638 (Mar. 6, 2009).

Communication of European Publication Number and Information on the Application of Article 67(3) EPC for European Patent No. 2011347 (Dec. 10, 2008).

Communication of European Publication Number and Information on the Application of Article 67(3) EPC for European Patent No. 2011346 (Dec. 10, 2008).

"3$^{rd}$ Generation Partnership Project; Technical Specification Group Core Network and Terminals; Numbering, addressing and identification (Release 8)," Global System for Mobile Communications, 3GPP TS 23.003, V8.1.0, pp. 1-60 (Jun. 2008).

"Tatara Systems Collaborates with AirWalk on SIP-Based CDMA Femtocell Solution," Tatara Systems, pp. 1-2 (Mar. 31, 2008).

Camarillo et al., "Subscriptions to Request-Contained Resource Lists in the Session Initiation Protocol (SIP)," SIPPING Working Group, pp. 1-10 (Jan. 26, 2007).

Xie et al., "Enhancements to RTP Payload Formats for EVRC Family Codecs," RFC 4788 (Jan. 2007).

Roach et al., "A Session Initiation Protocol (SIP) Event Notification Extension for Resource Lists," RFC 4662, pp. 1-37 (Aug. 2006).

"3rd Generation Partnership Project; Technical Specification Group Core Network; Numbering, addressing and identification (Release 5)," 3GPP TS 23.003, V5.11.0, pp. 1-39 (Jun. 2006).

Email re: [Sipping] MIME media types for SCCP and TCAP Objects (Mar. 23, 2005).

Worster et al., "Encapsulating MPLS in IP or Generic Routing Encapsulation (GRE)," RFC 4023, pp. 1-14 (Mar. 2005).

Peterson, "A Privacy Mechanism for the Session Initiation Protocol (SIP)," RFC 3323, pp. 1-21 (Nov. 2002).

Sidebottom et al., "Signaling System 7 (SS7) Message Transfer Part 3 (MTP3)—User Adaptation Layer (M3UA)," RFC 3332, pp. 1-113 (Sep. 2002).

Rosenberg et al., "SIP: Session Initiation Protocol," RFC 3261, pp. 1-252 (Jun. 2002).

"AIN/SIP Interworking," SR-5208, Telcordia Document (Dec. 20, 2001).

"Selected AIN Triggers in a SIP Environment," SR-5219, Telcordia Document (Dec. 18, 2001).

"Interoperability Specification (IOS) for CDMA 2000 Access Network Interfaces—Part 4 (A1, A2, and A5 Interfaces)," 3$^{rd}$ Generation Partnership Project 2, 3GPP2 A.S0014-0, Version 1.0, pp. 1-339 (Nov. 16, 2001).

"Cellular Radiotelecommunications Intersystem Operations," 3$^{rd}$ Generation Partnership Project 2, 3GPP2 N.S0005-0, Version 1.0 (Publication Date Unknown). (Part 1 of 3, pp. 1-3-295).

"Cellular Radiotelecommunications Intersystem Operations," 3$^{rd}$ Generation Partnership Project 2, 3GPP2 N.S0005-0, Version 1.0 (Publication Date Unknown). (Part 2 of 3, pp. 3-296-5-320).

"Cellular Radiotelecommunications Intersystem Operations," 3$^{rd}$ Generation Partnership Project 2, 3GPP2 N.S0005-0, Version 1.0 (Publication Date Unknown). (Part 3 of 3, pp. 5-321-6-469).

"EdgePoint™," AirWalk Communications, Inc., pp. 1-2 (Publication Date Unknown).

"OneRAN™ Series," AirWalk Communications, Inc., pp. 1-2 (Publication Date Unknown).

"Short Message Service," 3$^{rd}$ Generation Partnership Project 2, 3GPP2 C.S0015-0, pp. 1-52 (Publication Date Unknown).

Faynberg et al., "Service in the Public Switched Telephone Network/Intelligent Network (PSTN/IN) Requesting Internet Service (SPIRITS) Protocol Requirements," Lucent Technologies, pp. 1-17 (Aug. 2002).

Roach, "Session Initiation Protocol (SIP)-Specific Event Notification," dynamicsoft, pp. 1-38 (Jun. 2002).

Non-Final Official Action for U.S. Appl. No. 12/206,677 (Apr. 15, 2011).

First Office Action for Chinese Patent Application No. 200780021779.3 (Jan. 25, 2011).

Communication of European publication number and information on the application of Aritcle 67(3) EPC for European Application No. 08829296.6 (May 27, 2010).

Zenner et al., "Emerging Uses of SIP in Service Provider Networks," Bell Labs Technical Journal 8(1), pp. 43-63 (2003).

Dianda et al., "SIP Services Architecture," Bell Labs Technical Journal 7(1), pp. 3-23 (2002).

Handley et al., "SDP: Session Description Protocol," RFC 2327, pp. 1-42 (Apr. 1998).

Non-Final Official Action for U.S. Appl. No. 11/787,216 (Jun. 7, 2011).

First Office Action for Chinese Patent Application No. 200780021709.8 (Apr. 19, 2011).

\* cited by examiner

METHODS SYSTEMS, AND COMPUTER PROGRAM PRODUCTS FOR PROVIDING INTERNET PROTOCOL MULTIMEDIA SUBSYSTEM (IMS) SERVICES IN RESPONSE TO ADVANCED INTELLIGENT NETWORK (AIN) TRIGGERS

RELATED APPLICATIONS

This application claims the benefit of U.S. Provisional Patent Application Ser. No. 60/791,697, filed Apr. 13, 2006; the disclosure of which is incorporated herein by reference in its entirety.

This application is related to a commonly-assigned, co-pending U.S. Patent Application entitled Methods, Systems, and Computer Program Products for Providing Internet Protocol Multimedia Subsystem (IMS) Registration Services for Non-IMS Devices, filed on even date herewith, the disclosure of which is incorporated herein by reference in its entirety.

TECHNICAL FIELD

The subject matter described herein relates to providing IMS services. More particularly, the subject matter described herein relates to methods, systems, and computer program products for providing Internet protocol multimedia subsystem (IMS) services in response to advanced intelligent network (AIN) triggers.

BACKGROUND

IP multimedia subsystem (IMS) networks allow IMS-compatible devices to establish voice calls and to receive call originating and call terminating services using IMS network elements. In an IMS network, an IMS-compatible subscriber device, such as an IMS-compatible handset, is homed to a serving call session control function (S-CSCF). When an IMS-compatible device connects to a network anywhere, the IMS-compatible device first obtains an IP address. The IP address may be obtained by static assignment or by a dynamic protocol, such as DHCP. The IMS device then registers with the home S-CSCF. Registration involves communicating the IMS device or subscriber identity and the corresponding IP address to the S-CSCF. For example, IMS devices may be identified by SIP URIs. An example of an IMS device identity that may be associated with an IMS subscriber's SIP phone is Dan@Tekelec.com. The SIP phone may obtain an IP address of 196.10.10.1 when the phone connects to the network. Registration of the SIP phone involves communicating the association between 196.10.10.1 and Dan@Tekelec.com to the subscriber's S-CSCF. Registration of IMS devices can be accomplished through SIP messaging between the devices and their respective S-CSCFs.

Once an IMS device is registered with its S-CSCF, the device can originate and terminate calls and receive call originating and call terminating services using IMS network elements. For example, when the IMS device originates a call, the S-CSCF is notified of the call origination and queries a database, referred to as a home subscriber server (HSS) database, to determining call originating services to be applied to the call. Examples of call originating services include prepaid calling services and number portability services. The S-CSCF may then obtain routing information and invite the terminating device to the join the call. If the IMS device is at the terminating leg of the call, the S-CSCF receives an invitation for the device to join the call, determines the terminating services to apply to the call, and signals with the originating S-CSCF to establish the call.

It may be desirable to establish calls and to provide services using IMS nodes to non-IMS devices, such as 2G mobile phones and PSTN phones or black phones. 2G mobile phones and black phones are incapable of receiving calls or services using IMS network elements because such devices are not identifiable to the IMS network. For example, black phones and 2G mobile phones are incapable of registering with the IMS network because they do not have registration signaling capabilities. As a result, such devices can receive calls and services only by relying on PSTN network elements. Consequently, such devices may be limited in the types of service that they can receive and may be charged more for such services than the corresponding services available via the IMS network.

An additional problem to providing IMS services to non-IMS devices is the inability to communicate AIN triggers to the IMS networks. Within the PSTN, AIN standards are defined to specify how a call origination triggered service and a call termination triggered service may be implemented. Typically, an end office switch may define and set AIN triggers that are fired upon a call origination attempt by a subscriber or a call termination attempt to a subscriber. A fired call origination attempt further may result in a generation of a TCAP origination attempt message, while a fired call termination attempt trigger may result in the generation of a TCAP termination attempt message. These TCAP messages may be transmitted to another AIN network element, such as a service control point (SCP), which may use the information contained in the messages to provide call control or other call related services. Because these triggers are fired in the PSTN domain, there is no mechanism for using these triggers to invoke IMS services.

Accordingly, in light of these difficulties, there exists a need for improved methods, systems, and computer program products for providing IMS services in response to AIN triggers.

SUMMARY

The subject matter described herein relates to methods, systems, and computer program products for providing IMS services in response to AIN triggers. According to one aspect, a method for providing an IMS service in response to an AIN trigger is provided. The method includes detecting the firing of an AIN trigger concerning an IMS registered non-IMS device. An IMS service to be provided in response to the AIN trigger is identified. The IMS service is provided.

In another aspect of the subject matter disclosed herein, a computer program product comprising computer executable instructions embodied in a computer readable medium for performing steps is provided. The steps include registering a non-IMS device with an IMS network by transmitting a registration message to an IMS network element detecting firing of an AIN trigger concerning an IMS-registered non-IMS device. An IMS service to be provided in response to the AIN trigger is identified. The IMS service is provided using IMS network elements.

As used herein, the term "AIN trigger" refers to logic implemented at a PSTN switching office to initiate either a call originating or call terminating service. Examples of AIN triggers include call originating attempt triggers and call terminating attempt triggers.

BRIEF DESCRIPTION OF THE DRAWINGS

Preferred embodiments of the subject matter described herein will now be explained with reference to the accompanying drawings of which.

DETAILED DESCRIPTION

Figure 1:
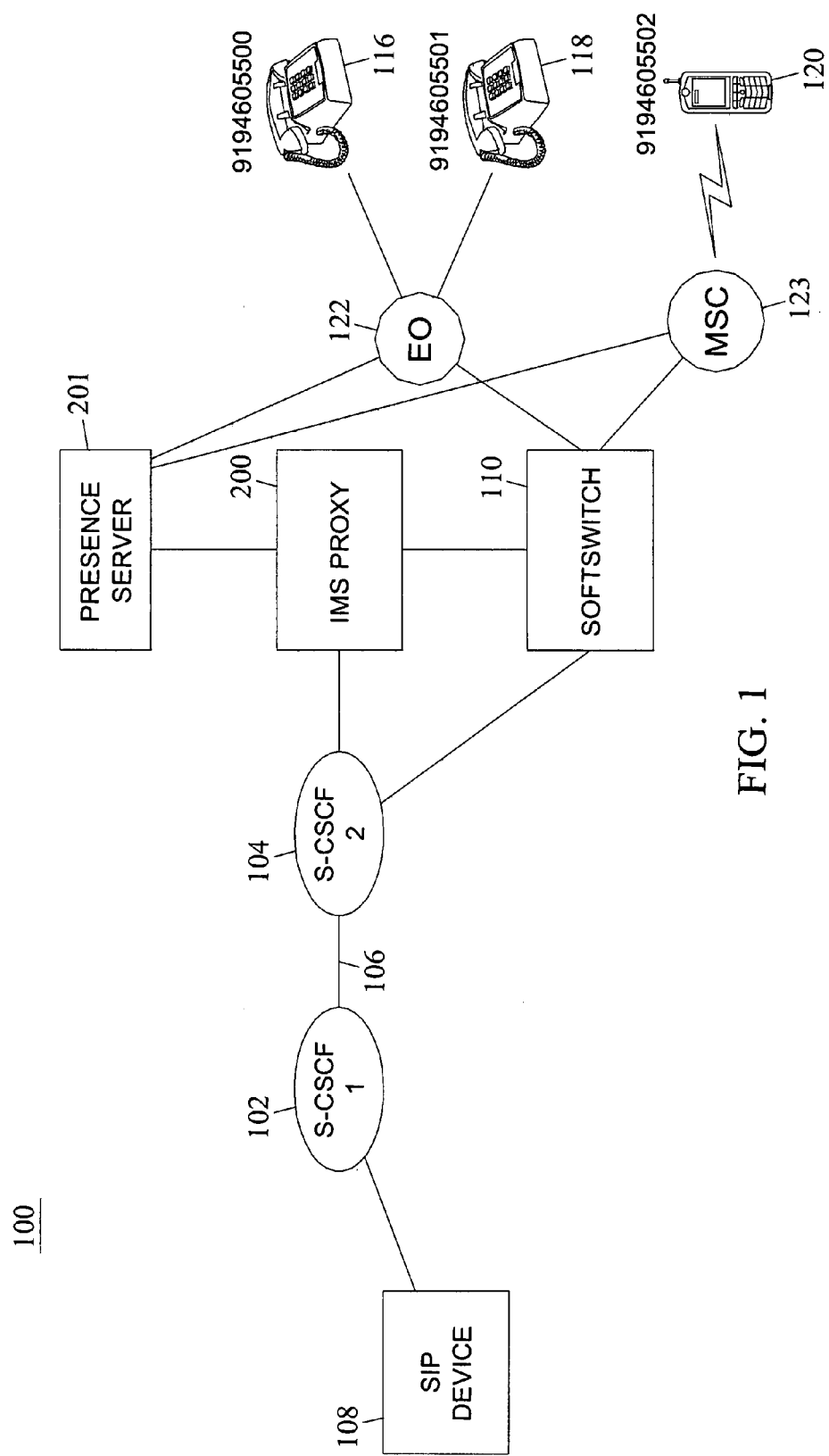
FIG. 1 is a network diagram illustrating an exemplary system for providing IMS registration services for non-IMS devices according to an embodiment of the subject matter described herein.

In light of the problems associated with providing calls and services to non-IMS devices using IMS network elements, the subject matter described herein includes methods, systems, and computer program products for providing IMS registration services and AIN trigger mapping for non-IMS devices. FIG. 1 illustrates an exemplary system 100 for providing IMS registration services for non-IMS devices according to an embodiment of the subject matter described herein. In FIG. 1, serving call session control functions (S-CSCF-1) 102 and S-CSCF-2 104 are shown interconnected via an IMS network 106. S-CSCF-1 102 and S-CSCF-2 104 provide access points for subscriber devices seeking to communicate using IMS network 106. An IMS-compatible SIP device 108 is shown connected to S-CSCF-1 102. SIP device 108 may be any 3G or higher generation device, such as a 3G cell phone or a personal digital assistant (PDA). SIP device 108 may generate and respond to SIP signaling messages for call setup and teardown. SIP device 108 is assumed to be IMS compatible and thus capable of registering with IMS network 106 through its associated S-CSCF-1 102.

A softswitch 110 is shown interconnecting S-CSCF-2 104 to an end office 122 and a mobile switching center (MSC) 123. Softswitch 110 may convert signaling between a signaling system 7 (SS7) signaling interface with end office 122 and MSC 123 and a SIP signaling interface with S-CSCF-2 104. Softswitch 110 may include or control media gateways (not shown) to send media stream communications between end subscribers that communicate using system 100.

As stated above, it may be desirable to establish calls and provide other services to non-IMS devices using IMS network elements. Examples of non-IMS devices shown in FIG. 1 are PSTN phones 116 and 118 and 2G mobile phone 120. These devices have conventionally been incapable of registering with the IMS network. In order to register non-IMS devices 116, 118, and 120 with IMS network 106, an IMS proxy 200 may be provided. IMS proxy 200 may have an IP address that can be used as an identity for non-IMS devices 116, 118, and 120 with the IMS network. In addition, IMS proxy 200 may perform registration on behalf of non-IMS devices 116, 118, or 120. It may be desirable to register a non-IMS device 116, 118, and 120 with the IMS network if the subscriber has subscribed with his or her service provider to receive IMS services and to maintain that registration for a finite time period during which the device may seek to access the IMS services. In the IMS world, IMS compatible devices may be registered when they are turned on or when they enter a service area. In the PSTN world, registration may be triggered by predetermined activity involving a non-IMS device. Three examples of activity that may be used to trigger IMS registration include change in presence status of a non-IMS device, detection of PSTN signaling messages involving a non-IMS device, or detection of predetermined subscriber action to register a non-IMS device. Examples of how each of these activities can be used to trigger IMS registration of a non-IMS device will be described in detail below. An IMS registration may be maintained for a finite time period after the activity that triggered the registration or until deregistration is expressly triggered.

Figure 2A:
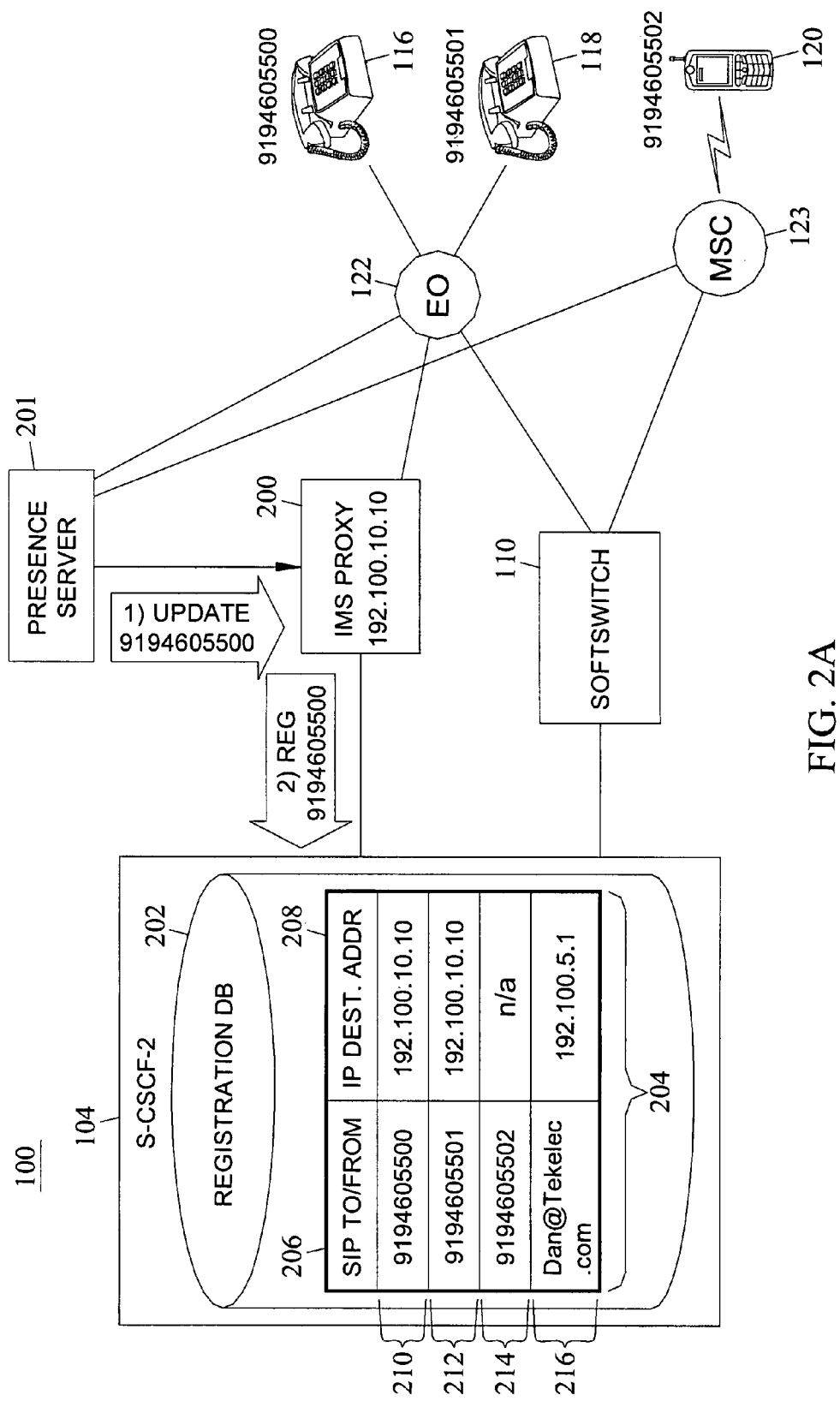
FIG. 2A is a block diagram of the system illustrated in FIG. 1 where IMS registration is triggered by presence status information updates according to an embodiment of the subject matter described herein.

In one example, IMS proxy 200 may receive updates from presence server 201 regarding the status of non-IMS devices 116,118, and 120 in order to identify activity regarding non-IMS devices 116, 118, and 120 and trigger IMS registration for the devices. FIG. 2A illustrates such an embodiment. In FIG. 2A, IMS proxy 200 has an IP address of 192.100.10.10. IMS proxy 200 receives an update message from presence server concerning PSTN telephone number 9194605500 associated with non-IMS device 116. In the example illustrated in FIG. 2A, it is assumed that IMS proxy 200 subscribes to the telephone number 9194605500 with presence server 201 to receive updates whenever the status of device 116 changes. For example, when a subscriber associated with device 116 initiates a call, a change in presence status and a corresponding update message may be generated. In an alternate embodiment, IMS proxy 200 may query presence server 201 for status updates regarding each non-IMS device 116, 118, and 120. IMS proxy 200 may be provisioned with the identities of devices 116, 118, and 120 at the time the subscribers subscribe to receive IMS service with their telephone service provider.

In response to receiving the update message, IMS proxy 200 may generate a corresponding registration message. The registration message may correlate the telephone number, 9194605500 to the IP address of IMS proxy 200. The registration message may be sent to S-CSCF 104 and the corresponding registration information may be stored in a registration database 202. In the illustrated example, registration database 202 includes a table structure 204. Table 204 includes a first column 206 that associates SIP to/from identifiers with corresponding IP addresses in column 208. In the illustrated example, row 210 associates the PSTN identifier 9194605500 with IP address 192.100.10.10, which corresponds to IMS proxy 200. The second row in table 204 associates the PSTN identifiers of non-IMS device 118 with the IP address of proxy 200. The third row 214 indicates that PSTN device is provisioned with S-CSCF 104 but is not registered. The final row in table 204 contains a mapping between a URL associated with an IMS subscriber and the corresponding IP address of the subscriber's device.

Figure 2B:
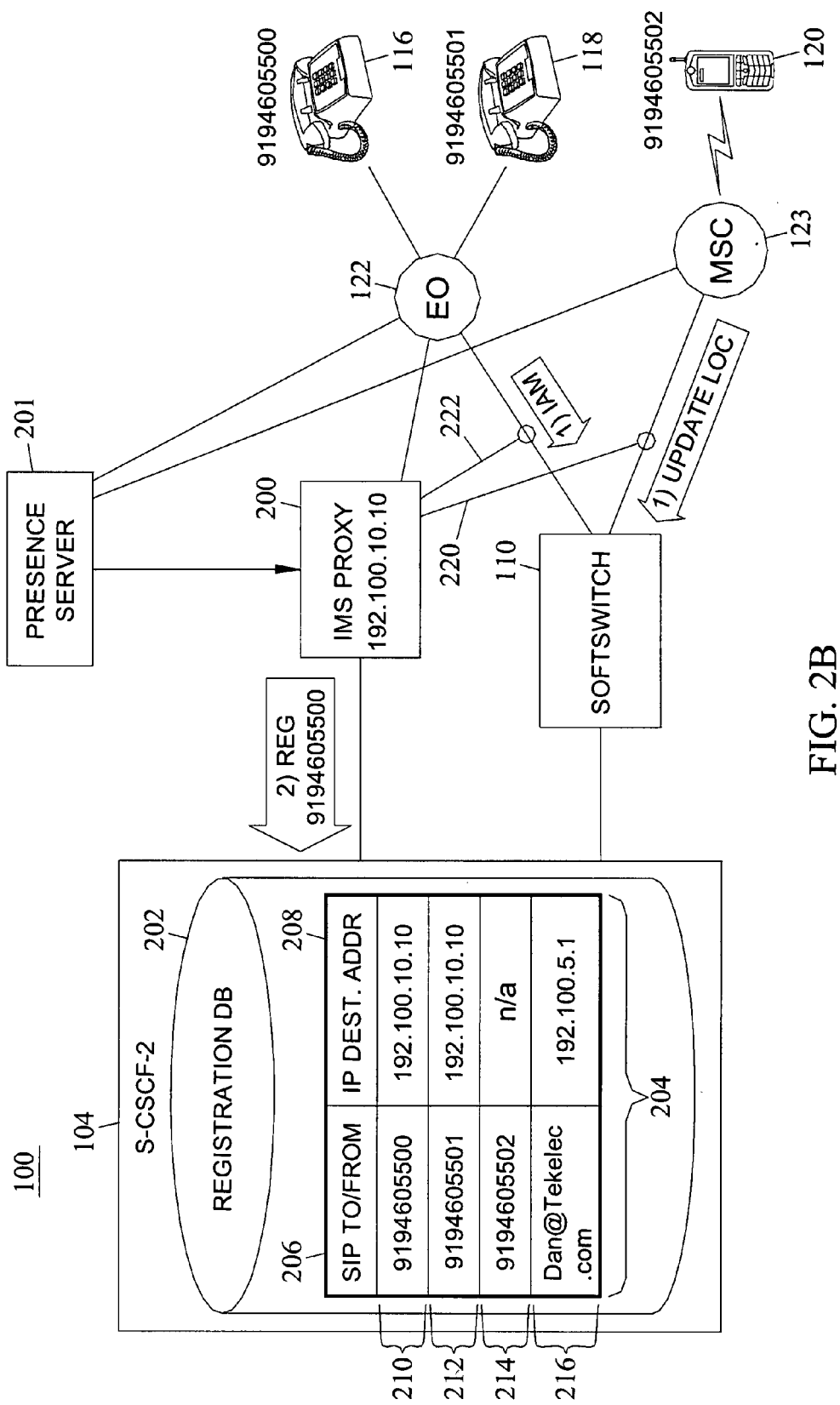
FIG. 2B is a block diagram of the system illustrated in FIG. 1 where IMS registration is triggered by monitoring SS7 signaling messages involving a non-IMS device according to an embodiment of the subject matter described herein.

In the example illustrated in FIG. 2A, activity involving non-IMS devices is identified and IMS registration is triggered based on presence status update messages concerning non-IMS devices. In an alternate example, activity involving non-IMS devices 116, 118 and 120 may be identified and IMS registration may be triggered through monitoring SS7 signaling messages involving non-IMS devices. FIG. 2B illustrates such an embodiment. In FIG. 2B, IMS proxy 200 may include an interface with end office 122 and/or signaling link probes 220 and 222 that monitor signaling links that connect end office 122 and MSC 123 to softswitch 110. The signaling links monitored may be SS7 over TDM links or SS7 over IP links. Accordingly, the signaling messages that are monitored may be SS7 messages over MTP transport or SS7 messages over IP transport, including SS7 over SIGTRAN over IP transport.

In the illustrated example, when non-IMS phone 116 initiates a call, end office 122 generates an ISUP IAM message. The ISUP IAM message may be used to trigger IMS registration of device 116 so that IMS services may be provided to device 116. In another example, when a PSTN phone, such as device 116 initiates a call, a TCAP message may be generated. The TCAP message may be used to trigger IMS registration of a non-IMS device. In yet another example, a mobile phone, such as 2G handset 120, may register with the network. In response to the registration, MSC 123 may generate a location update or registration notification message, depending on the network protocol being used. The location update or registration notification message may be used to trigger IMS registration of a non-IMS mobile device, such as device 120. In response to detecting the signaling messages, IMS proxy may generate a corresponding registration message and send the registration message to S-CSCF 104. S-CSCF 104 may be update registration database 202 to associate the PSTN identifier of the non-IMS device with the IP address of IMS proxy 200.

Figure 2C:
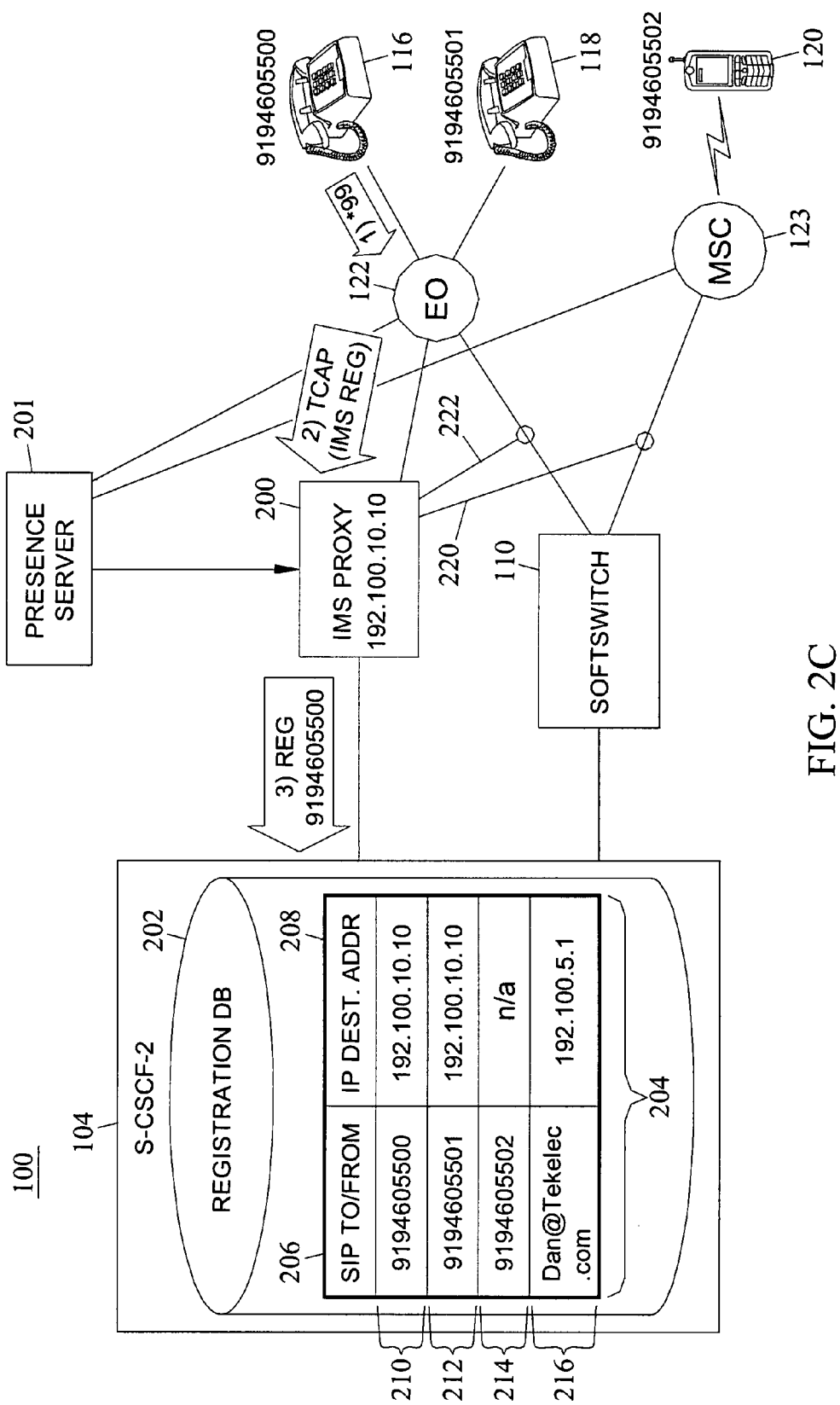
FIG. 2C is a block diagram of the system illustrated in FIG. 1 where IMS registration is triggered by subscriber action according to an embodiment of the subject matter described herein.

In yet another alternate example, the action that triggers registration of a non-IMS device may be predetermined subscriber action, such as the dialing of predetermined registration digits that trigger an IMS registration. FIG. 2C illustrates such an embodiment. In FIG. 2C, the subscriber at non-IMS device 116 may dial predetermined digits, such as *99 that are recognized by end office 122 as a trigger for IMS registration. In response to receiving the *99 digits, end office may send a message, such as a TCAP message with a payload indicating an IMS registration, to IMS proxy 200. IMS proxy 200 may generate a corresponding registration message that registers the non IMS device with S-CSCF 104.

Once a registration action occurs, it may be desirable to terminate a registration after a predetermined time period. For example, if no further activity has been detected from an IMS device within an operator configurable time period after an initial registration, an entry may be removed from registration database 202. Such a timeout-based deregistration mechanism may be implemented using a deregistration timer at S-CSCF 104. Each entry may have an associated timestamp. If the timestamp of an entry is older than a predetermined amount, an entry may be removed. The timestamp of an entry may be updated each time new activity that would trigger an IMS registration is detected.

Figure 3A:
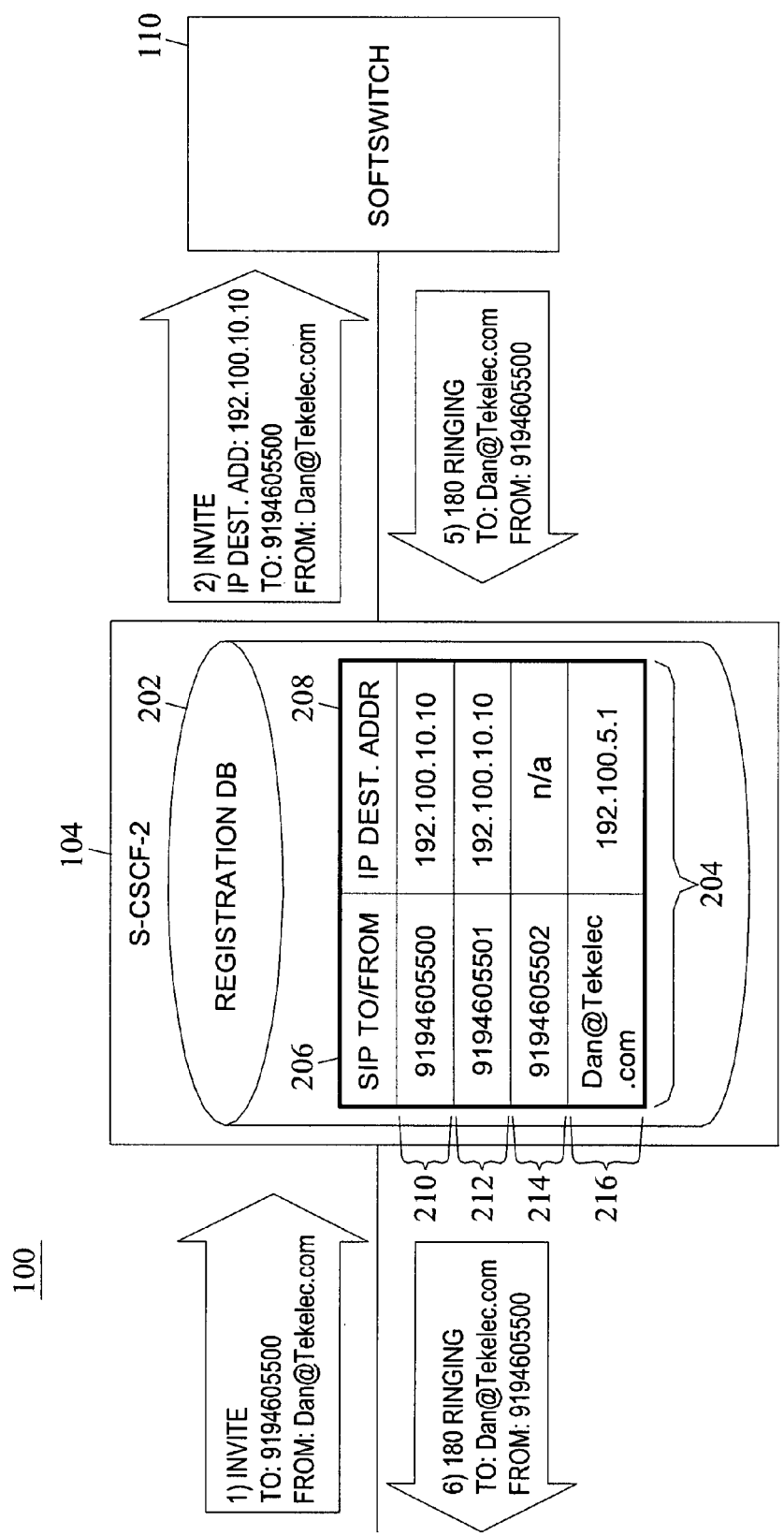
FIG. 3A is a block diagram of a first portion of the system illustrated in FIG. 1 showing SIP signaling for establishing a voice call with an IMS-registered, non-IMS device according to an embodiment of the subject matter described herein.
Figure 3B:
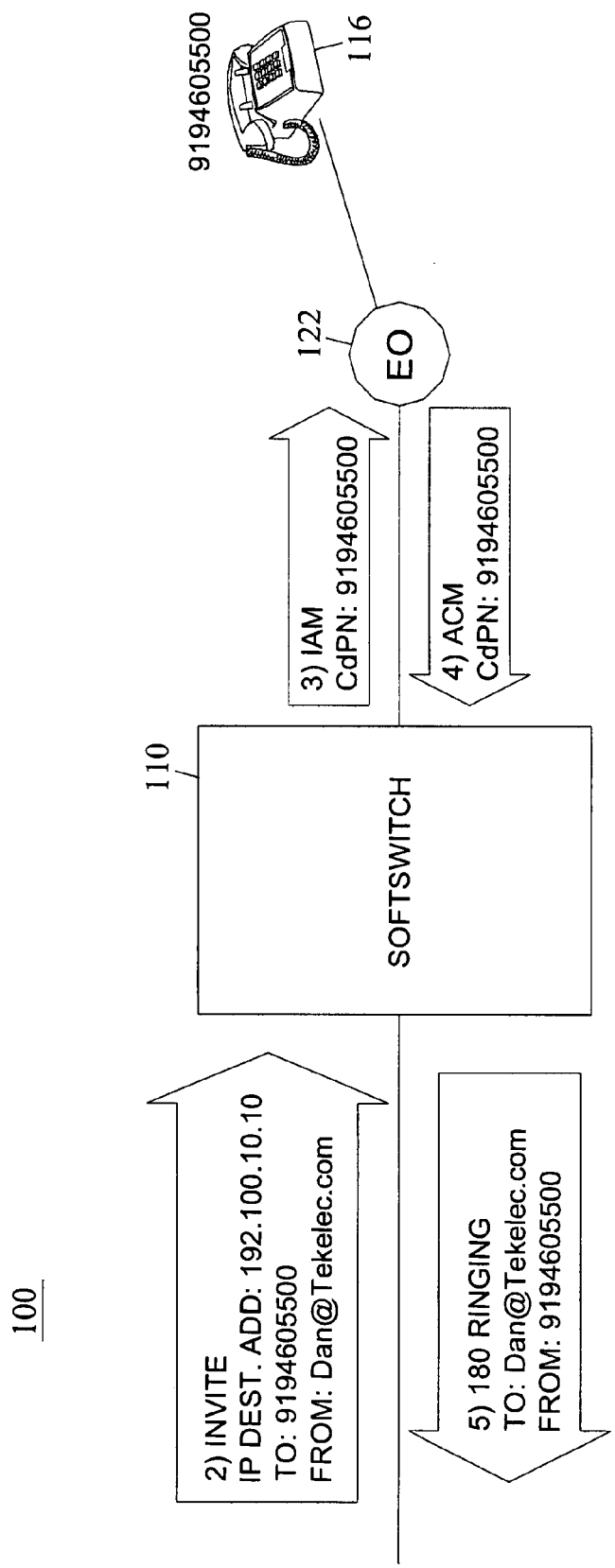
FIG. 3B is a block diagram of a second portion of the system illustrated in FIG. 1 showing ISDN user part (ISUP) signaling for establishing a voice call with an IMS-registered, non-IMS device according to an embodiment of the subject matter described herein.

FIGS. 3A and 3B illustrate the use of system 100 to connect a voice call between SIP device 108 and non-IMS phone 116 using the registration information generated and stored within registration database 202. In the message flow example illustrated in FIG. 3A, a SIP INVITE message is received by S-CSCF-2 104. The SIP INVITE message includes the non-IMS called party number in the destination "To:" field and the source email address in the source "From:" field.

Upon receipt of the SIP INVITE message, S-CSCF-2 104 may modify and forward the SIP INVITE message. By use of the information within routing table 204, the SIP INVITE message may be modified by addition of an IP address associated with 2G IMS proxy 200 within an "IP Dest. Add:" field. By performing a lookup within routing table 204 using the called party number which may be found within SIP To/From field 206 of row 210, S-CSCF-2 104 may identify the IP address of 2G IMS proxy 200 within IP destination address field 208 and may add it to the SIP INVITE message. In the message flow example illustrated within FIG. 3A, the SIP INVITE message as modified may be forwarded to softswitch 110.

FIG. 3B illustrates the receipt of the modified SIP INVITE message by 2G IMS proxy 200 within softswitch 110. Upon receipt of the modified SIP INVITE message, 2G IMS proxy 200 may originate and forward an SS7 initial address message (IAM) to end office 112. The IAM message may include the called party number of non-IMS subscriber 116 as the destination of the IAM message. End office 112 terminates the IAM message and rings non-IMS phone 116. End office 112 formulates and forwards an address complete message (ACM) to softswitch 110 to indicate that a trunk has been reserved for the voice call and to indicate that non-IMS phone 116 is ringing. Softswitch 110 originates and forwards a SIP 180 RINGING message to S-CSCF-2 104.

Returning to FIG. 3A, S-CSCF-2 104 forwards the SIP 180 RINGING message toward SIP device 108. Message forwarding may continue in this fashion until the SIP 180 RINGING message is received by SIP device 108. Call setup continues with a SIP 200 OK message (not shown) originating from end office 112 when non-IMS phone 116 is answered. At that point, voice communication may proceed and call setup may be completed.

Accordingly, IMS capable devices may use SIP signaling within network system 100 to initiate voice calls with non-IMS devices that are registered using the IMS registration services described above. Because non-IMS phones are registered with the IMS network, IMS calls and other services can be provided to such devices.

Figure 4:
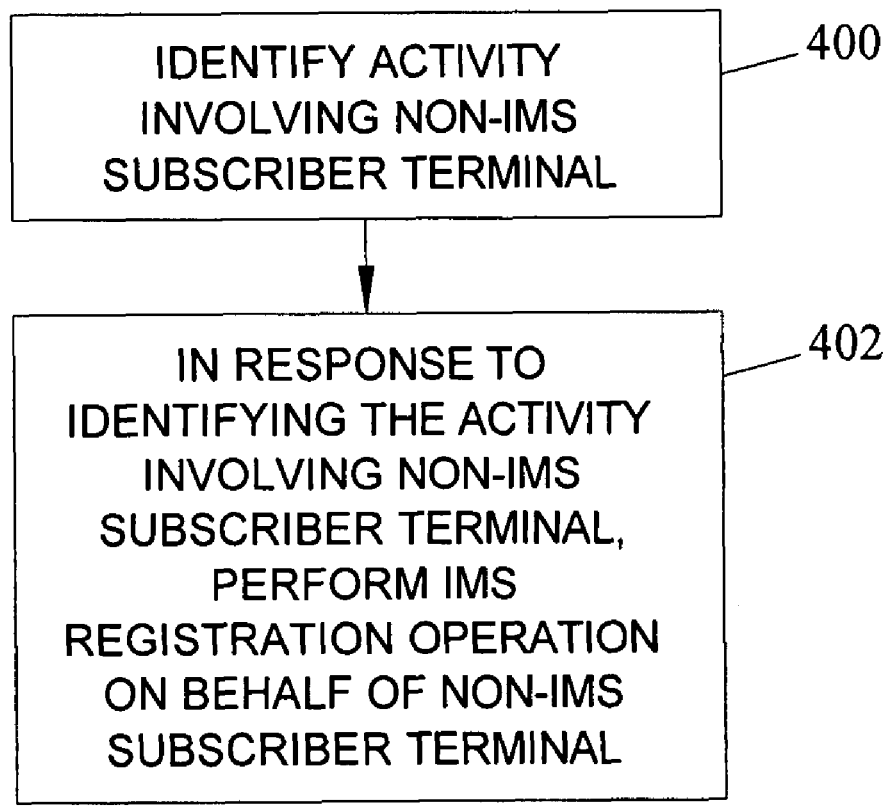
FIG. 4 is a flow chart illustrating a process for registering non-IMS devices with an IMS network according to an embodiment of the subject matter described herein.

FIG. 4 illustrates an exemplary process for registering non-IMS phones with an IMS network. In step 400, activity involving a non-IMS subscriber terminal is identified. Examples of activity that may be identified are described above with respect to FIGS. 2A-2C.

In step 402, the process may, in response to identifying the activity involving non-IMS subscriber terminal, perform an IMS network registration operation on behalf of the non-IMS subscriber terminal. Registration may be affected using IMS proxy 200 as illustrated in FIGS. 2A-2C.

Figure 5:
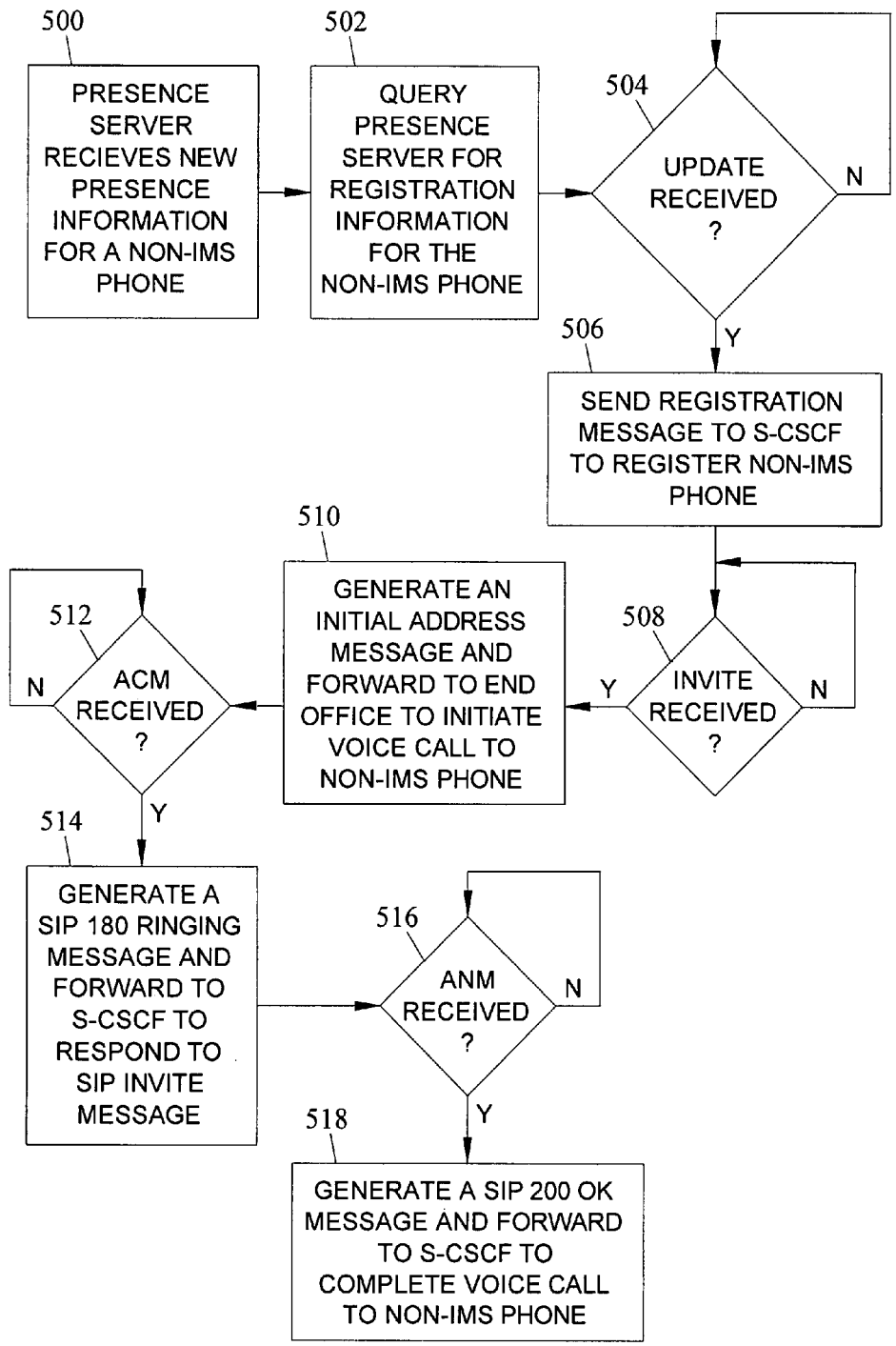
FIG. 5 is a flow chart illustrating a process for registering a non-IMS device with an IMS network by querying a presence server to identify activity involving the non-IMS device and for completing a call to the non-IMS device according to an embodiment of the subject matter described herein.

FIG. 5 illustrates an exemplary process for registering a non-IMS phone with an IMS network by having a softswitch query a presence server for registration information for the non-IMS phone and for establishing a call with the non-IMS phone. Referring to FIG. 5, in step 500, a presence server receives new presence information for a non-IMS phone. For example, the new presence information may be an indication that the non-IMS phone is initiating a new call.

In step 502, the presence server is queried for status information for the non-IMS phone. For example, IMS proxy 200 may query presence server 201 for the status of IMS phone 116. Alternatively, IMS proxy 200 may subscribe to a non-IMS phone with the presence server so that proxy 200 will be notified when presence information changes for a non-IMS phone. At decision point 504, IMS proxy 200 waits for an update message to be received from presence server 201. As described above, the update message may be in response to either a query or a subscription to IMS phone 116 with presence server 201. In step 506, once IMS proxy receives the update message, IMS proxy 200 sends registration information to an S-CSCF, such as S-CSCF-2 104, to register the non-IMS phone within an IMS network.

Once registered with the IMS network, call setup SIP signaling messages may be processed on behalf of the non-IMS phone. Such messages may be processed by softswitch 110 using registration information received from S-CSCF 104. At decision point 508, the process may wait to determine whether a SIP INVITE message has been received for the non-IMS phone. When a determination is made that a SIP INVITE message has been received for the non-IMS phone, the process may generate an SS7 IAM message and forward the IAM message to an end office, such as end office 122, to initiate a voice call to the non-IMS phone at step 510.

At decision point 512, the process may wait for an SS7 ACM message to be received from end office 122. Upon receipt of an ACM message, the process may generate a provisional SIP 180 RINGING message and forward the message to S-CSCF-2 104 as a response to the SIP INVITE message at block 514. At decision point 516, the process may wait for an SS7 ANM message to be received. Upon receipt of an ANM message, the process may generate a success SIP 200 OK message and forward the message to S-CSCF-2 104 as a success response to the SIP INVITE message at block 518 and a voice call may be established with the non-IMS phone via a voice trunk.

Figure 6:
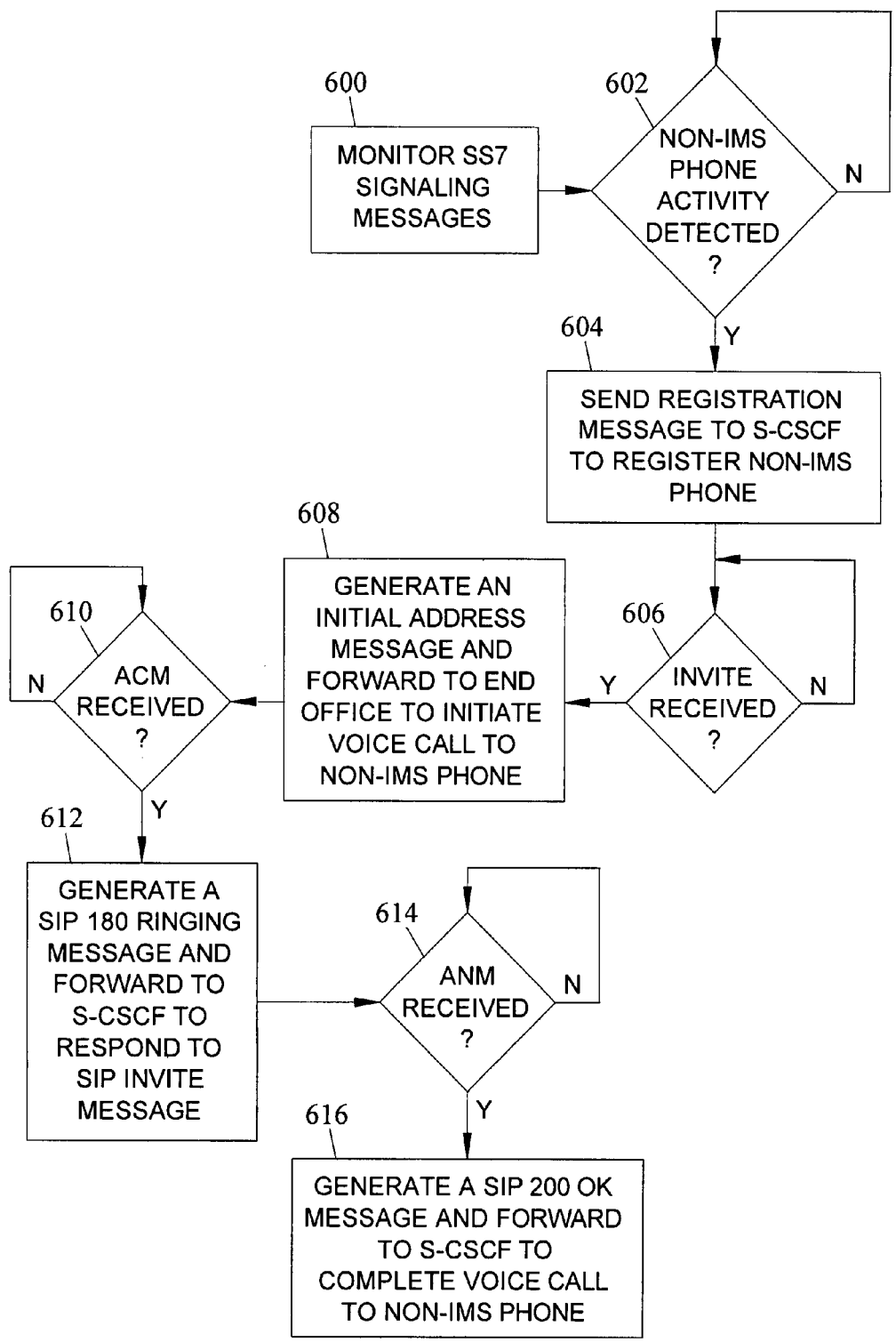
FIG. 6 is a flow chart illustrating a process for registering a non-IMS device with an IMS network by monitoring SS7 signaling messages associated with the non-IMS device to identify activity involving the non-IMS device and for completing a call to the non-IMS device according to an embodiment of the subject matter described herein.

FIG. 6 illustrates an exemplary process for registering a non-IMS by monitoring SS7 signaling messages associated with the non-IMS phone and for completing a call with the non-IMS phone. In steps 600 and 602, the process may monitor SS7 signaling messages to identify activity involving a non-IMS device that is provisioned to receive IMS services. For example, IMS proxy 200 may monitor SS7 signaling messages until ISUP, TCAP, MAP, IMAP, or other messages involving a non-IMS phone that is provisioned to receive IMS service are detected. In response to detecting such messages, control proceeds to step 604 where proxy 200 sends a registration message to the S-CSCF to register the non-IMS phone.

Once registered with the IMS network, call setup SIP signaling messages may be processed on behalf of the non-IMS phone. The call setup signaling messages may be processed by softswitch 110 using registration information obtained from S-CSCF 104. At decision point 606, the process may wait to determine whether a SIP INVITE message has been received for the non-IMS phone. When a determination is made that a SIP INVITE message has been received for the non-IMS phone, the process may generate an SS7 IAM message and forward the IAM message to an end office, such as end office 122, to initiate a voice call to the non-IMS phone at block 608.

At decision point 610, the process may wait for an SS7 ACM message to be received from end office 122. Upon receipt of an ACM message, the process may generate a provisional SIP 180 RINGING message and forward the message to S-CSCF-2 104 as a response to the SIP INVITE message at block 612. At decision point 614, the process may wait for an SS7 ANM message to be received. Upon receipt of an ANM message, the process may generate a success SIP 200 OK message and forward the message to S-CSCF-2 104 as a success response to the SIP INVITE message at block 616 and a voice call may be established with the non-IMS phone via a voice trunk.

Figure 7:
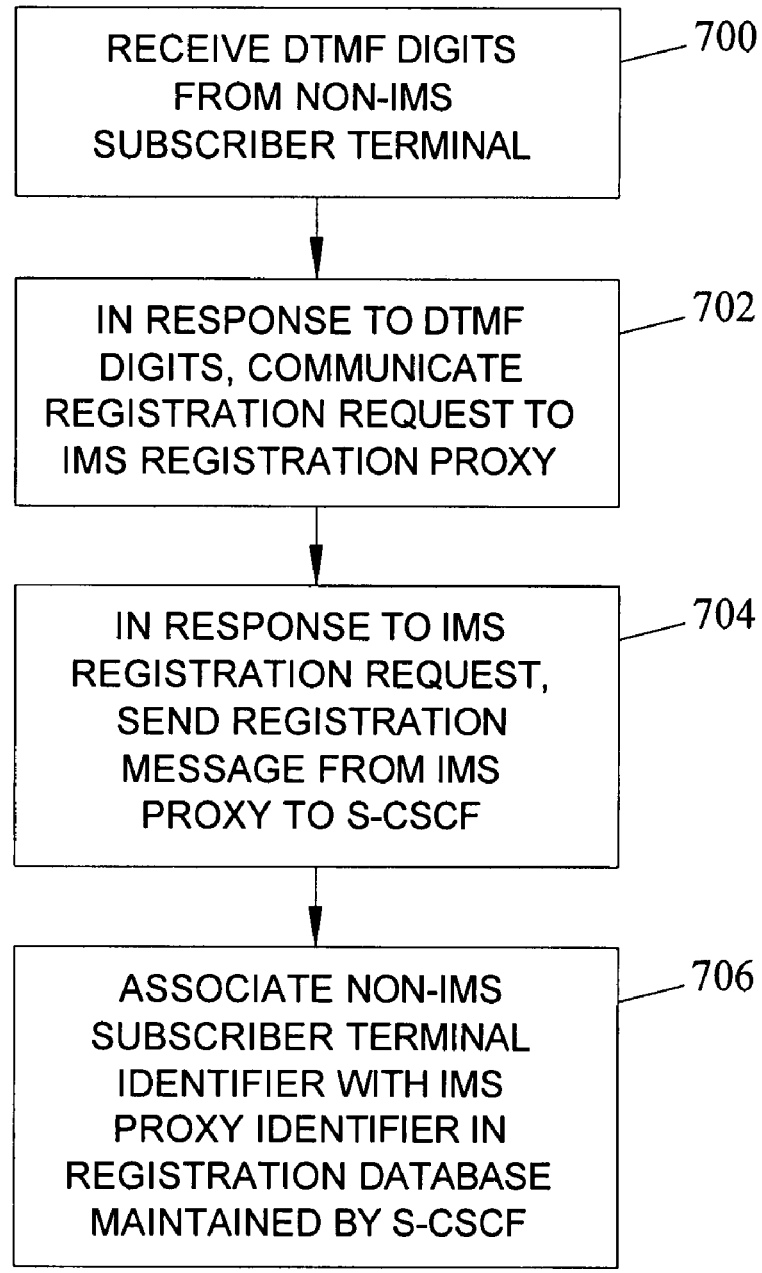
FIG. 7 is a flow chart illustrating a process for registering a non-IMS device with an IMS network based on subscriber action according to an embodiment of the subject matter described herein.

FIG. 7 is a flow chart illustrating an exemplary process for registering a non-IMS subscriber terminal with an IMS network in response to subscriber action according to an embodiment of the subject matter described herein. Referring to FIG. 7, in step 700, DTMF digits are received from a non-IMS subscriber terminal. The DTMF digits may be predetermined digits that are associated with an IMS registration request. The DTMF digits may be received by end office 122. In step 702, in response to the DTMF digits, end office 122 may communicate a registration request to IMS proxy 200. The registration request may be a TCAP message with a payload indicating that an IMS registration is requested. In step 704, in response to the IMS registration request, a registration message is sent from IMS proxy 200 to S-CSCF 104. In block 706, S-CSCF 104 associates the non-IMS subscriber terminal identifier with the IMS proxy identifier in its registration database. The non-IMS subscriber terminal may be the PSTN directory number of the subscriber terminal. For mobile phones, the non-IMS subscriber terminal may be the IMSI or MSISDN number associated with the terminal. The IMS proxy identifier may be an IP address associated with the IMS proxy.

In the examples described above, it is assumed that the non-IMS subscriber terminal is provisioned to receive IMS services. In an alternate example, a subscriber may subscribe to receive IMS services from any non-IMS terminal that the subscriber desires to use to communicate. For example, a subscriber may wish to use IMS services from a black phone in a hotel. In order to use the services, the black phone in the hotel must be registered with the IMS network. In order to register the black phone, the subscriber may initiate an IMS registration using a process similar to that illustrated in FIG. 7 where the subscriber communicates predetermined DTMF digits to initiate an IMS registration. In addition to the registration initiating digits, the subscriber may also communicate a subscriber identifier to the IMS network. The subscriber identifier may be an identifier that the IMS network recognizes as an identifier that is provisioned to receive IMS services. The subscriber identifier along with the directory number of the hotel black phone may be registered with the IP address of the IMS proxy in a serving call session control function, as described above.

AIN to IMS Trigger Mapping

Figure 8:
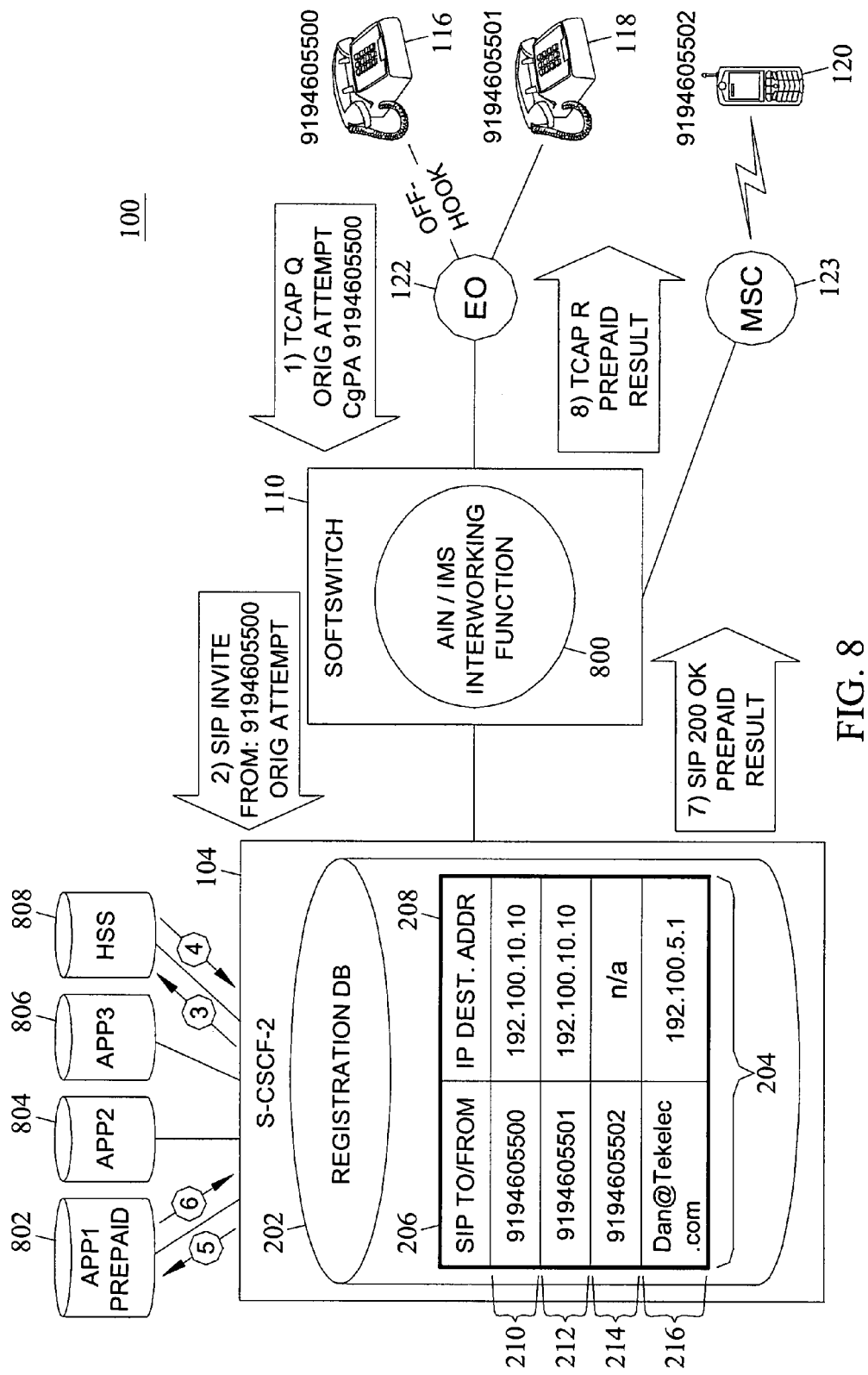
FIG. 8 is a network diagram illustrating an exemplary system for AIN to IMS trigger mapping according to an embodiment of the subject matter described herein.

As described above, an additional problem with connecting non-IMS devices to an IMS network is providing a mechanism for mapping AIN triggers to registered non-IMS devices to IMS triggers, so that the IMS network can provide AIN-like services to the registered devices. FIG. 8 is a network diagram illustrating an exemplary system for providing AIN to IMS trigger mapping according to an embodiment of the subject matter described herein. Referring to FIG. 8, softswitch 110 includes a 2G-AIN inter-working function 800 that maps PSTN triggers, such as call origination attempt triggers to AIN triggers. Softswitch 110 may also include 2G/IMS proxy 200, although proxy 200 is not illustrated in FIG. 8 for simplicity. The IMS network may include one or more platforms 802, 804, and 806 that provide AIN-like services to IMS registered devices. In the illustrated example, platform 802 comprises a prepaid platform for providing prepaid calling services to IMS-registered devices. The IMS network may also include a home subscriber server (HSS) 808 that stores profiles for IMS-registered devices. The IMS network may further include S-CSCF 104, which includes registration database 202 described above.

In operation, when an IMS-registered device, such as black phone 116 goes off hook, a TCAP call origination attempt trigger message is generated by end office 112. AIN/IMS inter-working function 800 receives the TCAP message. In an alternate example, the trigger message may be a MAP message, an INAP message, or a CAMEL-based message. AIN/IMS inter-working function 800 may translate, map, or encapsulate the AIN trigger and associated information, such as the subscriber identifier, into a form that may be communicated using a SIP message, such as a SIP invite, info, message, or other SIP message. In the illustrated example, a SIP invite message is used to communicate the call origination attempt trigger to the IMS network.

The resulting trigger carrying SIP message is forwarded to S-CSCF 104 that is associated with the 2G subscriber. The 2G subscriber is assumed to have been previously registered by IMS proxy 200 described above. In one implementation, S-CSCF 104 uses the 2G subscriber information in the SIP trigger message to query HSS 808. HSS 808 stores information associated with origination and termination attempt that is to be performed for the 2G subscriber. S-CSCF 104 receives information associated with the specified origination or termination attempt processing application and invokes the specified service on behalf of the 2G subscriber.

Figure 9:
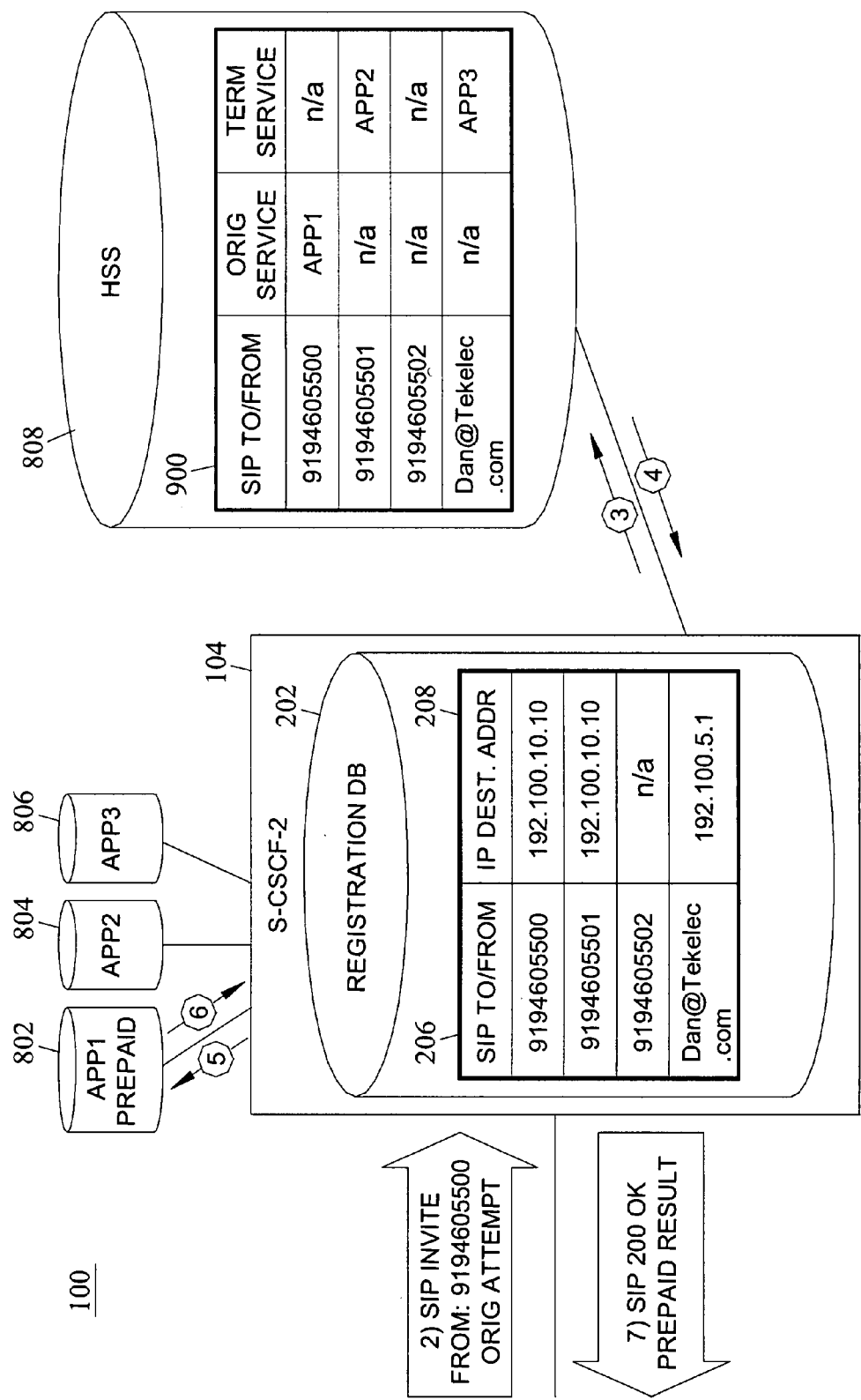
FIG. 9 is a network diagram illustrating in more detail the interaction with a home subscriber server (HSS) function in performing AIN to IMS trigger mapping according to an embodiment of the subject described herein.

FIG. 9 illustrates in more detail the database stored by HSS 808. In FIG. 9, HSS 808 includes a database 900 that stores information that indicates the type of trigger to be performed for a particular subscriber. In this example, database 900 indicates that the subscriber corresponding to 9194605500 receives application one (APP1) origination service. HSS 808 communicates this information to S-CSCF 104. S-CSCF 104 then queries platform 802 for the appropriate information. In the illustrated example, platform 802 is a prepaid application. The prepaid application may determine whether device 116 has sufficient prepaid credit to originate a call.

Returning to FIG. 8, once the subscriber is determined to have sufficient credit, S-CSCF 104 may generate a SIP message including the prepaid result. AIN/IMS inter-working function 800 may receive the SIP message and translate, map, or decapsulate payload information in the SIP message and generate a corresponding response to the originally received 2G AIN trigger message. In the illustrated example, the response is a TCAP response message indicating the prepaid result. The response message may be communicated to end office 112.

Figure 10:
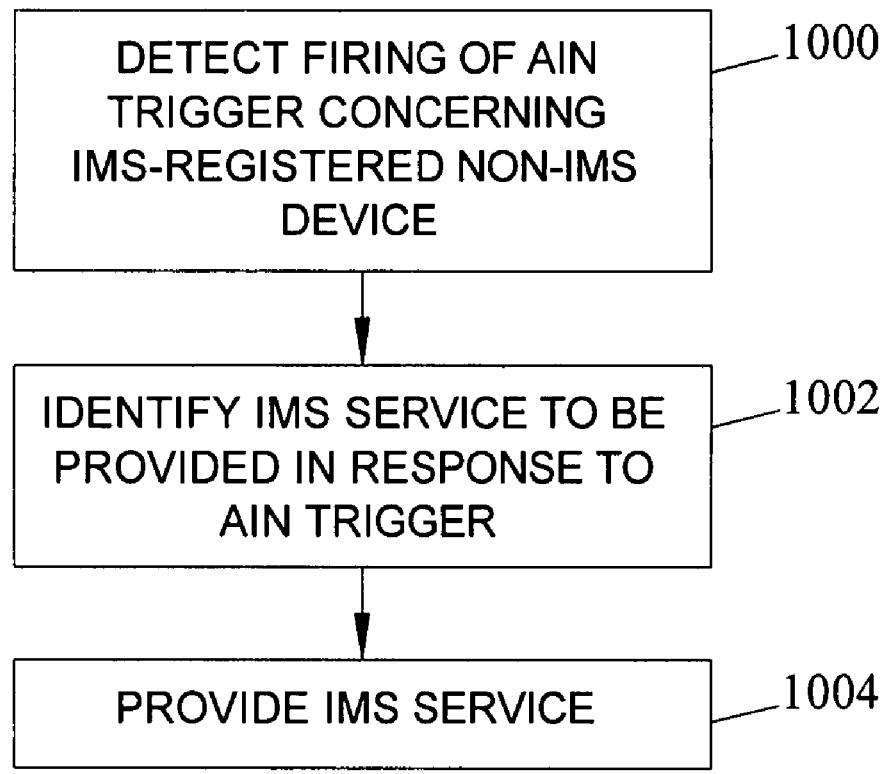
FIG. 10 is a flow chart illustrating an exemplary process for AIN to IMS trigger mapping according to an embodiment of the subject matter described herein.

FIG. 10 is a flow chart illustrating an exemplary process for providing an IMS service in response to an AIN trigger according to an embodiment of the subject matter described herein. Referring to FIG. 10, in step 1000, the firing of an AIN trigger concerning an IMS registered non-IMS device is detected. For example, referring to FIG. 8, AIN/IMS inter-working function 18 may detect a call originating attempt trigger corresponding to a call originated by device 116.

Returning to FIG. 10, in step 1002, an IMS service to be provided in response to the AIN trigger is identified. Returning to FIG. 8, inter-working function 800 communicates the firing of the call origination attempt trigger to the S-CSCF 104. S-CSCF 104 queries HSS 808 to determine the type of IMS service to be provided. HSS 808 may determine whether an originating or terminating attempt trigger is to be applied based on the leg of the call for which the trigger was generated and may select the appropriate service to be applied for the subscriber and the trigger type. In FIG. 9, the IMS service to be provided is identified as APP1 service or prepaid service.

Returning to FIG. 10, in step 1004, the IMS service is provided. Returning to FIG. 8, in order to provide the IMS service, S-CSCF 104 queries prepaid platform 802 and receives a response indicating whether or not the call can be completed. S-CSCF 104 assumes a prepaid result message to inter-working function 800, which generates a corresponding TCAP message indicating the prepaid result and communicates the TCAP message to end office 122.

The subject matter described herein is not limited to providing IMS services in response to call originating attempt triggers. For example, IMS services may also be provided in response to call terminating triggers.

Examples of services that may be provided in response to call terminating trigger include call screening services.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method for providing an IP multimedia subsystem (IMS) service in response to an advanced intelligent network (AIN) trigger, the method comprising:
    monitoring, at a network node, signaling messages involving non-IMS devices;
    at the network node, automatically registering a non-IMS device with an IMS network by sending a registration message to an IMS network element in response to detecting one of the following signaling messages transmitted between network elements:
    a call setup message associated with the non-IMS device; and
    a presence-related message associated with the non-IMS device;
    detecting, at the network node, firing of an AIN trigger concerning the IMS-registered non-IMS device;
    identifying an IMS service to be provided in response to the AIN trigger; and
    providing the IMS service,
    wherein detecting firing of an AIN trigger includes receiving a transaction capabilities application part (TCAP) message indicating the firing of the AIN trigger, wherein identifying an IMS service to be provided in response to the AIN trigger includes extracting information from the TCAP message and formulating a corresponding session initiation protocol (SIP) message including the trigger information and communicating the SIP message to a serving call state control function where the non-IMS device is registered, wherein identifying the IMS service includes querying a home subscriber server (HSS) function to identify the IMS service.

2. The method of claim 1 wherein detecting firing of an AIN trigger comprises detecting firing of a call originating attempt trigger.

3. The method of claim 1 wherein detecting firing of an AIN trigger includes detecting a call terminating attempt trigger.

4. The method of claim 1 wherein the IMS registered non-IMS device comprises a black phone.

5. The method of claim 1 wherein the IMS registered non-IMS device comprises a 2G mobile phone.

6. The method of claim 1 wherein providing the IMS service includes querying an IMS platform corresponding to the identified service type.

7. The method of claim 1 wherein providing an IMS service includes providing one of a prepaid and a call screening service.

8. A system for providing an IP multimedia subsystem (IMS) service in response to an advanced intelligent network (AIN) trigger, the system comprising:
  an IMS proxy for monitoring signaling messages involving non-IMS devices and for automatically registering a non-IMS device with an IMS network by sending a registration message to an IMS network element in response to detecting one of the following signaling messages transmitted between network elements:
  a call setup message associated with the non-IMS device; and
  a presence-related message associated with the non-IMS device; an AIN/IMS inter-working function, co-located with the IMS proxy, for detecting firing of an AIN trigger concerning an IMS-registered non-IMS device;
  a serving call session control function (S-CSCF) for identifying an IMS service to be provided in response to the AIN trigger; and
  an IMS platform for providing the identified service,
  wherein the AIN/IMS inter-working function is adapted to detect the firing of the AIN trigger by receiving a transaction capabilities application part (TCAP) message including information identifying the AIN trigger,
  wherein the AIN/IMS inter-working function is adapted to extract information from the TCAP message and formulate a corresponding SIP message including the AIN trigger identifying information,
  wherein the S-CSCF is adapted to receive the SIP message from the AIN/IMS inter-working function and to query a home subscriber server (HSS) in order to identify the IMS service to be provided in response to the firing of the AIN trigger.

9. The system of claim 8 wherein the AIN trigger comprises a call originating attempt trigger.

10. The system of claim 8 wherein the AIN trigger comprises a call terminating attempt trigger.

11. The system of claim 8 wherein the IMS-registered non-IMS device comprises a black phone.

12. The system of claim 8 wherein the IMS-registered non-IMS device comprises a 2G mobile telephone.

13. The system of claim 8 wherein the S-CSCF is adapted to query the IMS platform in order to provide the identified IMS service.

14. The system of claim 8 where in the IMS platform comprises one of a prepaid platform and a call screening platform.

15. A non-transitory computer program product comprising computer executable instructions embodied in a computer readable medium for performing steps comprising:
  monitoring, at a network node, signaling messages involving non-IMS devices;
  at the network node, automatically registering a non-IMS device with an IMS network by sending a registration message to an IMS network element in response to detecting one of the following signaling messages transmitted between network elements:
  a call setup message associated with the non-IMS device; and
  a presence-related message associated with the non-IMS device; detecting, at the network node, firing of an advanced intelligent network (AIN) trigger concerning an IP multimedia subsystem (IMS)-registered non-IMS device;
  identifying an IMS service to be provided in response to the AIN trigger; and
  providing the IMS service,
  wherein detecting firing of an AIN trigger includes receiving a transaction capabilities application part (TCAP) message indicating the firing of the AIN trigger,
  wherein identifying an IMS service to be provided in response to the AIN trigger includes extracting information from the TCAP message and formulating a corresponding session initiation protocol (SIP) message including the trigger information and communicating the SIP message to a serving call state control function where the non-IMS device is registered,
  wherein identifying the IMS service includes querying a home subscriber server (HSS) function to identify the IMS service.

* * * * *